Dec. 3, 1957 W. H. NEWELL ET AL 2,815,170
BOMB DIRECTOR FOR OFFSET BOMBING
Filed July 18, 1946 3 Sheets-Sheet 1
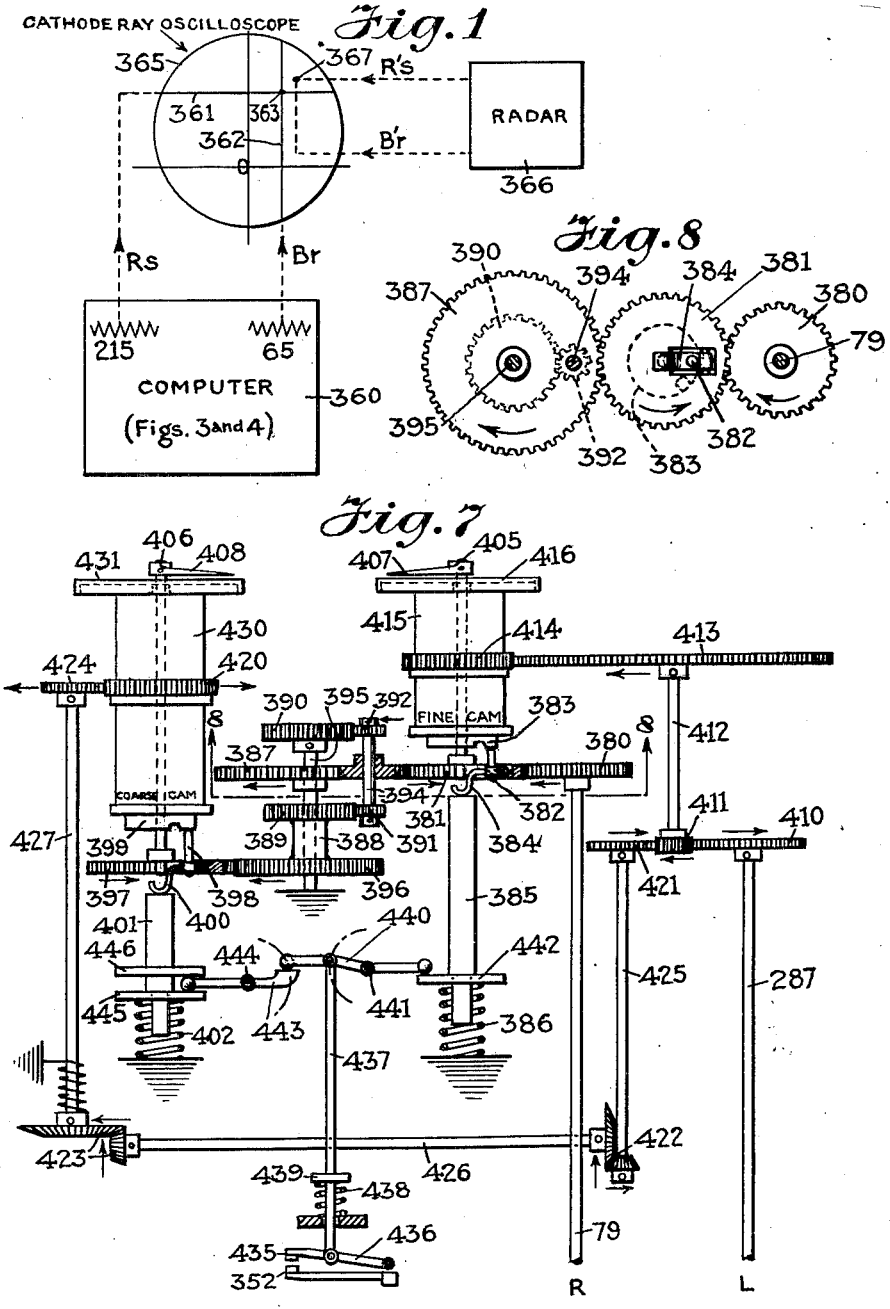
INVENTOR
WILLIAM H. NEWELL
LAWRENCE S. BROWN
ATTORNEY Dec. 3, 1957   W. H. NEWELL ET AL   2,815,170
BOMB DIRECTOR FOR OFFSET BOMBING
Filed July 18, 1946   3 Sheets-Sheet 2
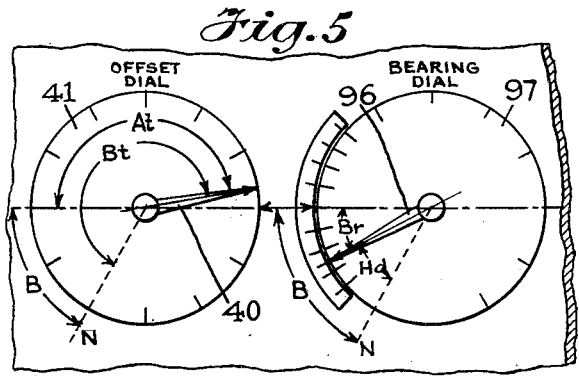
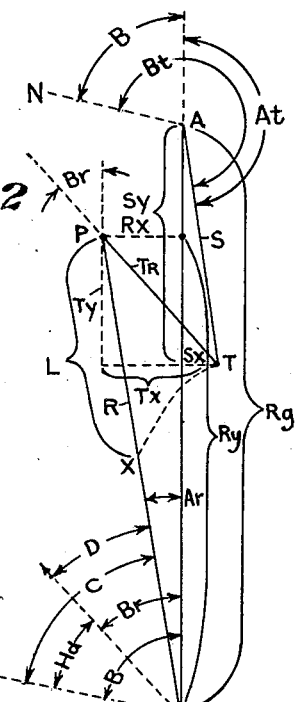
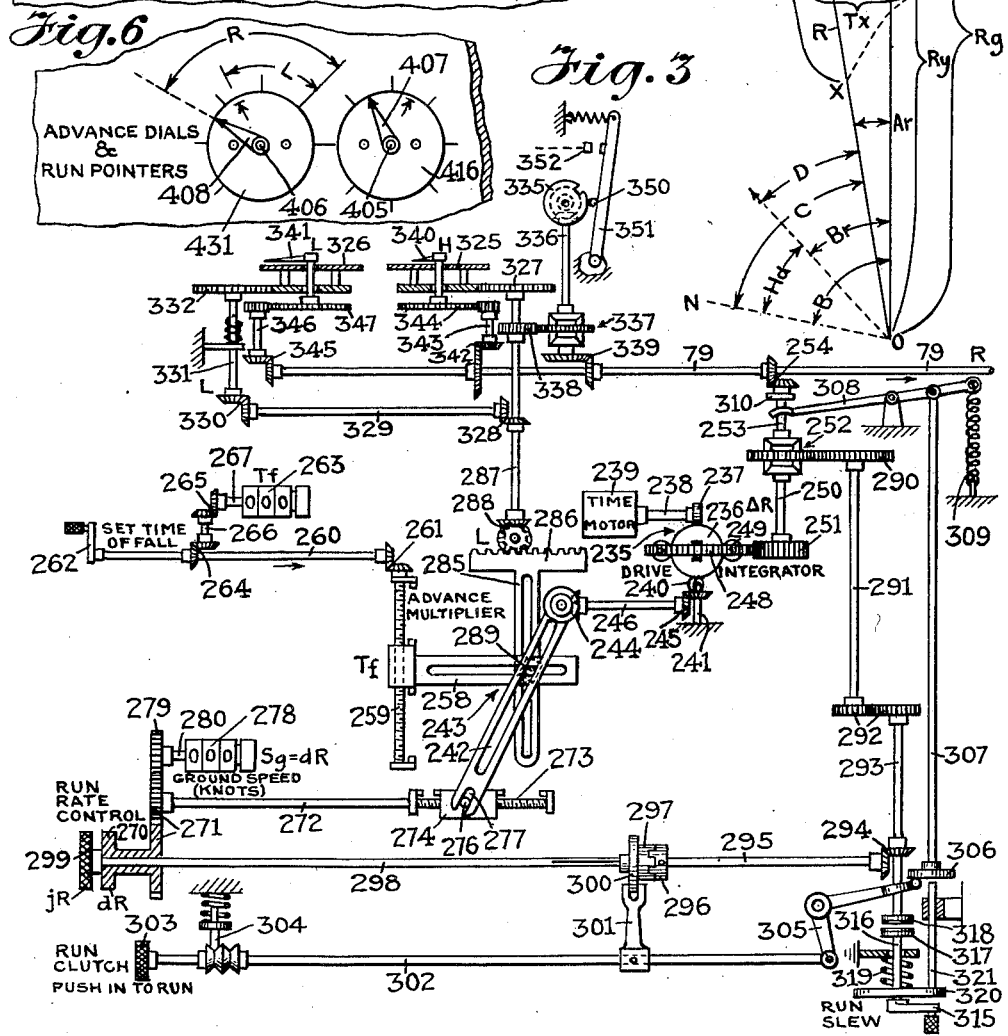
INVENTORS
WILLIAM H. NEWELL
LAWRENCE S. BROWN
ATTORNEY

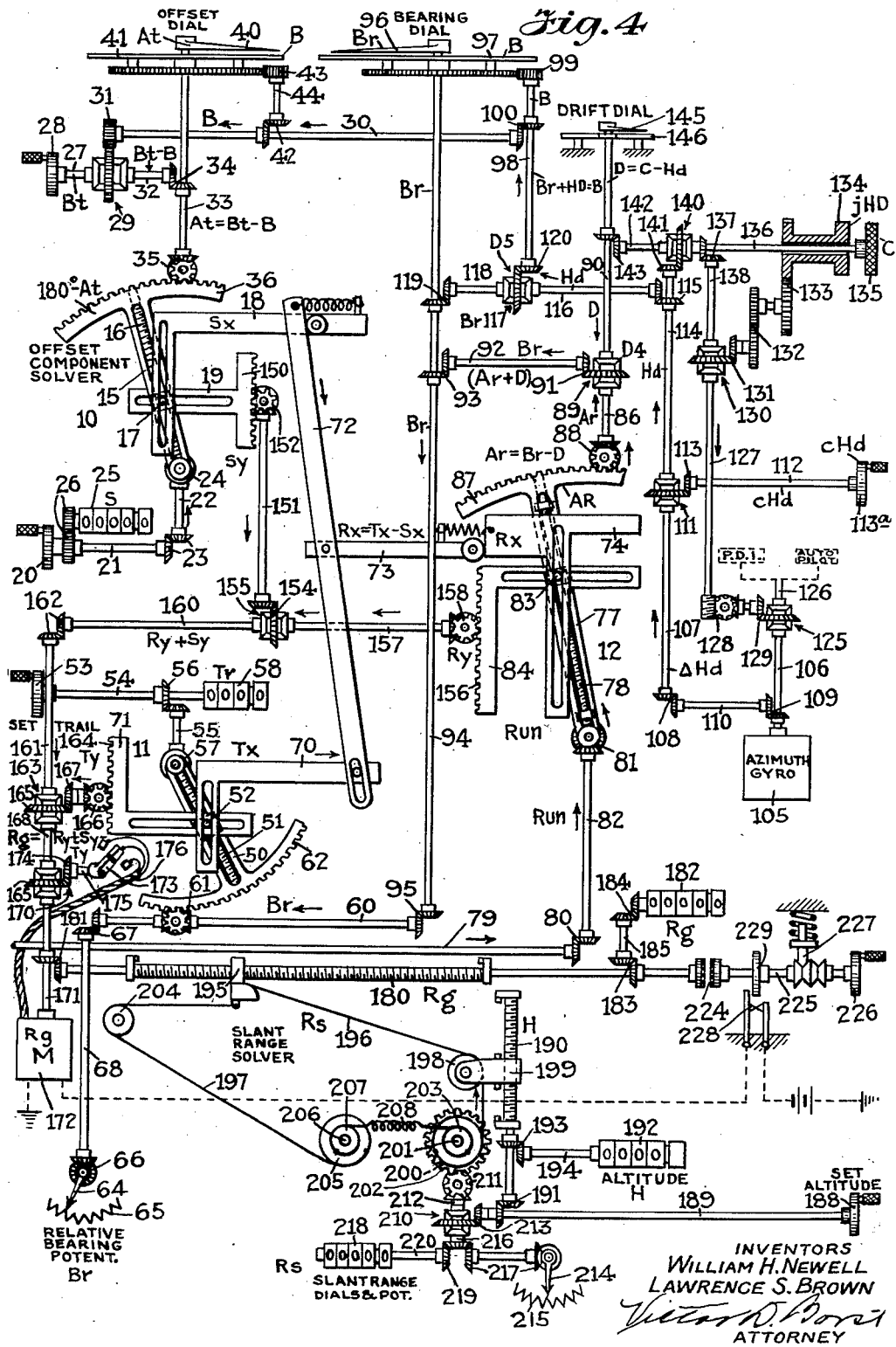

United States Patent Office 2,815,170
Patented Dec. 3, 1957

2,815,170
BOMB DIRECTOR FOR OFFSET BOMBING

William H. Newell, New York, and Lawrence S. Brown, Long Island City, N. Y., assignors to Sperry Rand Corporation, a corporation of Delaware Application July 18, 1946, Serial No. 684,618

5 Claims. (Cl. 235—61.5)

This invention relates to a computer for offset bombing and more particularly to a computer for determining the correct air heading and time of release of a bomb in terms of an aiming point which may be offset by as much as several miles from the target and whose slant range and relative bearing are known or may be determined from the airplane by suitable means such as radar. The computer will also solve for ground speed and drift angle which may be used for navigational purposes.

An object of the invention is to provide a device of the above type having novel and improved features of operation.

Another object is to provide a device of the above type which is accurate and dependable and may be used effectively under military conditions.

Various other objects and advantages will be apparent as the nature of the invention is more fully disclosed.

Although the novel features which are characteristic of this invention are pointed out more particularly in the claims, the nature of the invention will be better understood by referring to the following description, taken in connection with the accompanying drawings in which a specific embodiment has been set forth for purposes of illustration.

In the drawings:

Fig. 1 is a diagrammatic representation of a bomb director system embodying the present invention;

Fig. 2 is a diagram illustrating the problem solved by the apparatus;

Figs. 3 and 4, taken side by side, show a schematic diagram of the apparatus;

Fig. 5 is a detail view of the offset and bearing dials;

Fig. 6 is a detail view of the run pointers and advance dials;

Fig. 7 is a schematic diagram of one type of bomb release control mechanism, and Fig. 8 is a detail view of gearing shown in Fig. 7.

Referring first to the following diagrams (Fig. 2): O represents the present position of the airplane. A represents the known aiming point whose observed bearing B'r and observed slant range R's may be continuously determined from the airplane by suitable means such as a range-finder or radar equipment of standard type. T represents the target which cannot be seen or located directly from the airplane and is offset by a known distance S from the aiming point A. Bt represents the known bearing of the target T from the aiming point A. R is the run of the airplane from the point O to a position P which it will assume at the instant the bomb hits the target T. X represents the point along the run R at which the bomb is to be released to hit the target T. Tr represents the trail of the bomb (the distance $\overline{PT}$). L is the advance (the distance $\overline{PX}$). Hd is the air heading of the airplane from the meridan N. D represents the drift angle due to wind. C is the actual ground course or track of the airplane to reach the point X. Br is the computed relative bearing of the aiming point A from the heading of the airplane. Ar is the run angle (the angle between $\overline{AO}$ and $\overline{PO}$). At is the offset angle ($Bt$—$B$). Tx, Rx and Sx represent the components of Tr, R and S respectively normal to the line $\overline{AO}$. Ty, Ry and Sy represent the components of Tr, R and S respectively along the line $\overline{AO}$. Rg represents the ground range $(\overline{AO})$ of the aiming point A. dBr and dB'r represent the rate of change of Br and B'r respectively.

The offset bombing problem may be divided into four parts for convenience of explanation, viz: angle solution, range solution, ground speed solution, and advance solution.

The ground projection diagram (Fig. 2) shows that for certain conditions of Trail and Time of Fall (both determined by Air Speed and Altitude), Offset (known from map, etc.), and Drift (determined by relative wind), there exists a single Run line (R) at an angle (Ar) to the line of sight $(\overline{OA})$ along which an aircraft must travel to pass through the correct release point (X) and arrive at predicted position (P) at the instant the bomb hits the target (T). The correct aircraft heading (Hd), in the air, will then differ from the course (C), on the ground, by the drift angle (D).

The formulae for this sequence of solutions is as follows:

$$Ar = \sin^{-1}\frac{(Tx-Sx)}{R} = \sin^{-1}\frac{Rx}{R}$$
$$D = Br - Ar$$
$$Hd = C - D$$

It will be seen that the above solution is of the regenerative type and requires a series of adjustments by the operator to satisfy all inter-related conditions.

The angle solution is based on comparison of angles and rates of change of angles of computer generated relative bearing (Br and dBr) and observed relative bearing (B'r and dB'r) as viewed on the radar oscilloscope as will be described.

The ground range solution is based on the equation $Rg = Ry + Sy - Ty$.

The ground speed is determined by the rate of change of run (dR).

The advance L is the ground speed (dR) multiplied by the known time of fall of the bomb (Tf). When L equals R the airplane is at point X and the bomb must be released.

The computer mechanism for solving the above problem is shown in Figs. 3 and 4 and comprises an offset component solver 10 (Fig. 4) which is arranged to solve for Sx and Sy, a Trail component solver 11 which is arranged to solve for Tx and Ty, and a Run component solver 12 which is arranged to solve for Rx and Ry.

The offset component solver 10 comprises a pivoted arm 15 carrying a shaft 16 on which a pin 17 is threaded and component slides 18 and 19 which are positioned by the pin 17. The shaft 16 is actuated by an offset crank 20 through shafts 21 and 22 and gears 23 and 24. A counter 25, driven by gears 26 from the shaft 21 indicates the value of the offset S.

The offset bearing Bt is set into a shaft 27 by an offset bearing crank 28. The shaft 27 is connected to one input of a differential 29, the other input of which is actuated by a shaft 30 through gears 31. The shaft 30 carries the value B as will be described. The output of the differential 29, representing ($Bt$—$B$)=$At$ is connected by shafts 32 and 33 and gears 34 and 35 to position a rack 36 attached to the arm 15. The rack 36 is connected to position the arm 15 in accordance with the value (180°—$At$).

A pointer 40 is actuated by the shaft 33 to register with a dial 41. The dial 41 is driven from the shaft 30 by gears 42 and 43 and a shaft 44. The pointer 40 thus takes a position relative to the dial 41 representing $(B+At)=Bt$, the offset bearing.

The trail component solver 11 comprises a pivoted arm 50 carrying a shaft 51 on which a pin 52 is threaded. Trail $Tr$ is set into the shaft 51 from a trail set crank 53 by shafts 54 and 55 and gears 56 and 57. The shaft 54 is also connected to a counter 58 which registers the trail setting. The trail angle, which is the same as the relative bearing $Br$, is set into the arm 50 from a shaft 60 through gear 61 and rack 62. The shaft 60 also actuates the movable arm 64 of a potentiometer 65 through gears 66 and 67 and shaft 68. The potentiometer 65 is connected as a transmitter to control the relative bearing $(Br)$ of an indicator such as a cathode ray tube. The pin 52 actuates component slides 70 and 71 which represent $Tx$ and $Ty$ respectively.

The $Sx$ and $Tx$ component slides 18 and 70 are connected by a link 72 and an arm 73 pivotally connected thereto, to actuate a component slide 74 of the run component solver 12. The movement of the arm 73 and of the slide 74 represents $(Tx-Sx)=Rx$.

The run component solver 12 includes a pivoted arm 77 carrying a shaft 78 which is actuated from a shaft 79 through gears 80 and 81 and shaft 82. The shaft 78 carries a pin 83 which is threaded thereon and cooperates with component slides 74 and 84 which represent $Rx$ and $Ry$ respectively. The angle of the arm 77, which represents the run angle $Ar$, is applied to a shaft 86 by a rack 87 attached to the arm 77 and gears 88. The shaft 86 is connected to one input of a differential 89.

A shaft 90, which is actuated to represent drift D by connections to be described, is connected to the other input of the differential 89. The output of the differential 89, which represents $Ar+D=Br$, is taken by gears 91 to a shaft 92, thence by gears 93, shaft 94 and gears 95 to the shaft 60 above mentioned. The shaft 94, which represents $Br$, also carries a pointer 96 which registers with a dial 97. The dial 97 is driven from a shaft 98 by gears 99. The shaft 98 also drives the shaft 30 through gears 100. The shaft 98 is driven to represent the true bearing B of the aiming point A. Hence the relative position of the pointer 96 on the dial 97 indicates $(B-Br)=Hd$, the air heading.

A stable element 105 such as an azimuth gyro maintains a shaft 106 in a position representing the meridian, or N on the diagram of Fig. 2 by varying the shaft in accordance with instantaneous change in heading $Hd$. The shaft 106 drives a shaft 107 through gears 108 and 109 and shaft 110. The shaft 107 actuates one side of a differential 111, a second input of which is taken from a shaft 112 by gears 113. The shaft 112 is actuated by a heading set crank 113a. The output of the differential 111, which represents the air heading $Hd$, is fed by a shaft 114, thence through gears 115 and shaft 116 to one side of a differential 117. The other side of the differential 117 is driven by a shaft 118 and gears 119 from the $Br$ shaft 94. The output of the differential 117, $(Br+Hd)=B$, drives the bearing shaft 98 by gears 120.

The shaft 106 also drives one side of a differential 125 the output of which drives a shaft 126 which leads to a control apparatus such as a pilot direction indicator (P. D. I.) or an automatic pilot. The heading $Hd$ is fed into the differential 125 by a shaft 127 through gears 128 and 129. The shaft 127 is driven by the output of a differential 130, an input of which is driven by gears 131 through a gear train 132, 133 from a heading set knob 134. The other input of the differential 130 is driven from a course set knob 135 through shaft 136, gears 137, and shaft 138. The shaft 136 also drives one side of a differential 140, the other input of which is taken from the shaft 114 through gears 141. The output of the differential 140 drives shaft 142, gears 143 and shaft 90. The position of shafts 136 and 114 represent C and $Hd$ respectively. Hence the output of differential 140 represents $(C-Hd)=D$, the drift angle. This is fed to the shaft 90 which carries a pointer 145, registering with a dial 146 to indicate drift, and which drives one side of the differential 89 as above described.

The $Sy$ slide 19 of the component solver 10 carries a rack 150 which drives a shaft 151 through gears 152. The shaft 151 drives a gear 154 of a differential 155.

The $Ry$ slide 84 of the component solver 12 carries a rack 156 which drives a shaft 157 through gears 158. The shaft 157 is connected to one side of the differential 155. The other side of the differential drives a shaft 160 which thus represents the value $(Ry+Sy)$. The shaft 160 drives a shaft 161 through gears 162. The shaft 161 drives one side of a differential 163.

The $Ty$ slide 71 of the component solver 11 carries a rack 164 which drives a gear 165 of the differential 163 through gears 166 and 167. The output of the differential 163, which represents $(Ry+Sy-Ty)=Rg$, drives a shaft 168 which is connected to one side of a differential 170, the other side of which is connected by a shaft 171 to a follow-up motor 172 which supplies sufficient power to actuate the slant range solver to be described. The output of the differential 170 drives a control contactor 173 through gears 174 and a shaft 175. The contactor 173 is connected to a control cable 176 which is connected to control the motor 172 so as to cause the motor 172 to follow the movement of the $Rg$ shaft 168.

The slant range solver is of the type disclosed in detail in a copending application of Newell and Brown, Ser. No. 620,484, filed October 5, 1945, and is shown as comprising a threaded shaft 180 which is driven from the shaft 171 by gears 181 and actuates a counter 182 through gears 183 and 184 and a shaft 185. The counter 182 gives a continuous reading of the ground range $Rg$.

Altitude is set into the slant range solver by an altitude set crank 188 which actuates a shaft 189. The shaft 189 drives a threaded altitude shaft 190 by gears 191. The shaft 190 drives a counter 192 by gears 193 and a shaft 194. The counter 192 indicates the altitude setting.

A tape support 195 is threaded on the shaft 180 and carries one end of a slant range tape 196 and also one end of a tensioning tape 197. The tape 196 passes around a pulley 198 mounted on a carrier 199 which is threaded on the shaft 190. The other end of the tape 196 is wound onto a drum 200 which is mounted on a shaft 201 with a gear wheel 202 and a drum 203. The tape 197 passes around a fixed pulley 204 and is wound onto a drum 205 which is mounted on a shaft 206 with a drum 207. A spring 208 has its ends attached to the drums 203 and 207 to apply a force to hold the tapes 196 and 197 under a substantially constant tension.

The gear wheel 202 drives one side of a differential 210 through gears 211 and shaft 212. The differential cage is driven by gears 213 from the shaft 189. The output of the differential 210 drives the movable contact 214 of a potentiometer 215 through shaft 216 and gears 217, and a counter 218 by gear 219 and shaft 220. The output of the differential 210 represents $Rs$, computed slant range which is indicated on the counter 218. The potentiometer 215 is connected as a transmitter to control a computed slant range $(Rs)$ indicator such as a cathode ray tube. The outputs of the potentiometers 215 and 65 may be used, for example, to control the position of horizontal and vertical lines 361 and 362 (Fig. 1) or a spot 363 on a cathode ray tube 365 to indicate both the computed relative bearing $Br$ and the computed slant range $Rs$.

The shaft 180 is also connected by a normally open clutch 224 and a shaft 225 to a crank 226. Spring actuated detent 227 holds the shaft 225 in a retracted or advanced position. A contact 228 is opened by a disc 229 on the shaft 225 when the shaft 225 is in clutch engaging position. The contact 228 is connected in the energizing circuit of the motor 172 to deenergize the same when the clutch 224 is engaged.

The knob 226 is used to set the Rg shaft 180 to zero in which case the slant range output on counter 218 should be the same as the altitude on counter 192. This procedure permits an altitude check to be made. When the clutch 224 is released the contacts 228 close and cause the motor 172 to run the shaft 180 back to its proper Rg setting.

Referring to Fig. 3 the shaft 79 is driven at a rate proportional to ground speed (dR) by a ball type integrator 235 of the type shown more in detail in the co-pending application of Newell, Serial No. 592,136, filed May 5, 1945. This integrator comprises a ball 236 driven by a roller 237 mounted on a shaft 238 driven at a constant speed by a constant speed motor 239. The axis of rotation of the ball is determined by a steering roller 240 which is oriented about the axis of a shaft 241. The roller 240 is oriented from a pivoted arm 242 of a multiplier 243 through gears 244 and 245 and a shaft 246. The ball 236 drives a cage 248 carrying idler rollers 249, which drives a shaft 250 through gears 251. As pointed out in detail in the Newell application Serial No. 592,136, the cage 248 and shaft 250 are driven at a rate proportional to the tangent of the angle of orientation of the steering roller 240.

The shaft 250 drives one side of a differential 252 the other side of which drives a shaft 253 which is geared to the shaft 79 by gears 254.

The multiplier 243 comprises an input slide 258 which is carried on a threaded shaft 259, driven by a shaft 260 through gears 261. The shaft 260 is set by a crank 262 and drives a counter 263 through gears 264 and 265 and shafts 266 and 267. The knob 262 is adjusted to set the time of fall into the multiplier 243 as registered on the counter 263. Ground speed ($Sg=dR$) is set into the multiplier 243 from a rate knob 270 through gears 271 and shaft 272 having a threaded portion 273. A collar 274 is threaded onto the portion 273 and carries a pin 276 riding in a slot 277 in the pivoted arm 242. A counter 278 is driven from the shaft 272 by a gear 279 and a shaft 280 to indicate the ground speed $Sg$ in knots. The arrangement is such that the position of the shaft 246 represents the tangent of the angle of the arm 242. Hence the output of the integrator (shaft 250) is driven at a rate proportional to the ground speed $Sg$.

The multiplier 243 includes an output slide 285 carrying a rack 286 which drives a shaft 287 through gears 288. The arm 242 and slides 258 and 285 are set by a pin 289. The output to the shaft 287 represents ground speed $Sg$ times time of fall $Tf$ which equals the computed advance L.

The cage of the differential 252 is connected by gears 290, shaft 291, gears 292, shaft 293 and gears 294 to shaft 295 carrying a clutch element 296. A sliding clutch element 297 is keyed to a shaft 298 carrying a set knob 299. The clutch element 297 carries a collar 300 which is actuated by a forked arm 301 carried on a sliding rod 302. The rod 302 carries a knob 303 and is latched in closed or open positions by a spring pressed pin 304. The rod 302 is connected to a bell crank lever 305 which actuates a collar 306 on a rod 307 connected to a brake lever 308 which is biased by a spring 309 to apply a drag to a collar 310 on the shaft 253 except when released by the bell crank lever 305. A reset crank 315 actuates a shaft 316 carrying a clutch element 317 to engage a clutch element 318 on the shaft 293 when pressed upwardly. A spring 319 holds the clutch elements 317 and 318 disengaged. The shaft 316 also carries a collar 320 which engages a rod 321 to push the rod 307 upwardly to release the brake arm 308 when the clutch elements 317 and 318 are engaged. When the brake arm 308 is released and clutch 296, 297 is engaged the elements exert sufficient drag to prevent the gears 290 from turning and the shaft 253 is driven from the shaft 250. The knob 299 may then be used to make adjustments of the run shaft 79. When the clutch 296, 297 is released by pulling the knob 303 outwardly (to the left in Fig. 3) the arm 308 prevents the run shaft 79 from turning and the drive of the shaft 250 is diverted to the shafts 291, 293 and 295 which turn idly.

The advance L is set into a dial 325 from shaft 287 by gears 327 and into a dial 326 by gears 328, shaft 329, gears 330, shaft 331 and gears 332. The advance L is also set into a bomb release cam 335 by a shaft 336 connected to a differential 337 which is driven from shaft 287 by gears 338. One side of the differential 337 is driven from shaft 79 by gears 339. The shaft 79 also drives a pointer 340, registering with the dial 325, by gears 342, shaft 343 and gears 344, and a pointer 341 registering with the dial 326 by gears 345, shaft 346 and gears 347. The pointers 340 and 341 and dials 325 and 326 are geared to represent fine and coarse indications respectively, for example at a 10 to 1 ratio. The cam 335 controls a follower 350 on an arm 351 which is biased to close a contact 352 when in the correct position. The contact 352 may be connected to control the bomb release mechanism.

In Fig. 1 the computer 360 represents the mechanism above described and shown in Figs. 3 and 4. The output from the potentiometers 215 and 63 are connected respectively to central horizontal and vertical sweep lines 361, 362, showing a spot 363 at their intersection, of a cathode ray oscilloscope 365. A radar set 366 having the usual means to determine distance R's and bearing B'r is connected to control a spot or pip 367 of the cathode ray oscilloscope. The spot 363 thus represents the value of the computed Br and Rs and the pip 367 represents the values B'r and R's. When the two spots coincide and remain together the computer has been correctly adjusted.

*Operation*

The following table lists the functions of the various inputs and outputs of the computer:

INPUTS

| Function | Symbol | Type | Where Read |
|---|---|---|---|
| Offset | S | Crank 20 | Counter 25. |
| Trail | Tr | Crank 53 | Counter 58. |
| Time of Fall | Tf | Crank 262 | Counter 263. |
| Altitude | H | Crank 188 | Counter 192. |
| Offset Bearing | Bt | Crank 28 | Offset Dial 41. |
| Set Heading | cHd | Crank 113a | Heading Pointer 96. |
| Heading Increment | ΔHd | Shaft 106 (from Gyro). | Bearing Dial 97. |
| "Turn" | C | Knob 135 | (Add Hd to D). |
| "Drift" | jHd | Knob 134 | Heading or Drift Dial 146. |
| Run Correction | jR | Knob 299 | Run Dials 325, 326. |
| Run Rate | dR | Knob 270 | Ground Speed Counter 278. |
| Run Slew | jR | Crank 315 | Run Dials 325, 326. |
| Rg Zero-Set | Rg | Crank 226 | Ground Range Counter 182. |
| Run-Stop Control | R | Knob 303 | |

OUTPUTS

| | | | |
|---|---|---|---|
| Heading Signal | jHd | Shaft 127 (to differential 125). | |
| Slant Range Signal | Rs | Potentiometer 215. | Slant Range Counter 218. |
| Bearing Signal | Br | Potentiometer 65. | Bearing Pointer 96. |
| Bomb Release | | On-Off Cam 335. | Run Pointers and Advance Dials 325, 326, 340, 341. |

The run clutch control knob 303 provides for starting and stopping the integration of ranges and bearings with the time motor 239 and integrator system running under regulation until needed. With the control knob 303 pulled out the time of fall T$f$ and ground speed S$g$ may be pre-set by crank 262 and knob 270 respectively. When the observed value of the run R's as seen by the pip 367 on the oscilloscope equals the computed run R$s$ to which the computer has been set by the run slew crank 315 the knob 303 is pushed in to start the run integrator. The run slew crank 315 is normally in its "out" or disconnected position but is pushed in to reset the run dials with the run stop knob 303 in run position.

The time of fall counter 263, and trail counter 58 are pre-set from ballistic tables. The ground speed counter 278, altitude counter 192 and offset counter 25 are preset to briefed values.

The altitude is checked by setting the ground range R$g$ to zero by the crank 226 and then setting the altitude H by crank 188 to match the observed altitude as shown by the pip 367 derived from the ground signal of the radar. The crank 226 is then pulled out to allow the motor 172 to synchronize the ground range R$g$ setting of the shaft 180 with the computed ground range of the shaft 168.

The heading is set on the pointer 96 by crank 113$a$ to agree with the compass heading. The true bearing B is then set on the dial 97 by the "turn" knob 135.

The airplane's heading is then controlled by adjusting the "drift" knob 134 to match the computed bearing B$r$ with the observed bearing B'$r$ on the oscilloscope. Now when the observed range R's matches the pre-set computer range R$s$ the run clutch knob 303 is pushed in to start the run shaft 79 which is then driven by the integrator 235. The computed range R$s$ is matched with the pip 367 by adjustment of the outer knob 299 and its rate is matched with the rate of the pip 367 by adjustment of the inner rate control knob 270. The computer then drives the pointers 340 and 341 and the cam 335 to follow the continuously computed value of the run R. When this becomes equal to the computed advance L to which the cam has been adjusted by the output shaft 287 of the advance multiplier 243 the follower 350 will enter the cam notch and close the bomb release contact 352. The progress of the run can be observed by the relative positions of the dials 325 and 326 and pointers 340 and 341. When these match the bomb release will occur.

The computer may be used to determine drift and ground speed for navigational purposes by setting the offset distance and trail to zero. Any ground object may then be tracked until the oscilloscope pip is matched. The drift angle and ground speed may then be read directly from the computer.

Figs. 7 and 8 show a system of coarse and fine control devices for accurately timing the bomb release which may take the place of the cam 335 and follower 350 of Fig. 3. In this embodiment the run shaft 79 and advance shaft 287 are driven as in Fig. 3. The shaft 79 of Fig. 7 carries a gear 380 meshing with a gear 381 carrying a cam follower 382 which is pressed upwardly against an annular cam track 383 by a spring 384 bearing against the end of a plunger 385 which in turn is biased upwardly by a spring 386.

The gear 381 drives a gear 387 which turns on a fixed shaft 395 and carries a shaft 394 on which are planet gears 391 and 392. The planet gear 392 revolves around a fixed gear 390, which is mounted on the fixed shaft 395. The planet gear 391 revolves around a gear 389 which is mounted on a common sleeve 388 with a gear 396 and turns on the shaft 395. In the form shown the gears 391 and 392 have the same number of teeth and the gear 389 has one or more teeth than gear 390 so as to rotate slowly in the same direction as the gear 387. The gear 396 drives a gear 397 carrying a cam follower 398 which is pressed against an annular cam track 399 by a spring 400 bearing against the end of a plunger 401 which is biased upwardly by a spring 402. The cam tracks 383 and 399 are notched at selected points to receive the respective cam followers when brought into registration therewith. The gears 381 and 397 are mounted on shafts 405 and 406 respectively carrying pointers 407 and 408 corresponding to the pointers 340 and 341 of Fig. 3.

The shaft 287 carries a gear 410 driving a gear 411 on a shaft 412 which carries a gear 413 driving a gear 414 on a sleeve 415 carrying the cam track 383 and carrying a dial 416 corresponding to the dial 325 of Fig. 3. The gear 411 also drives a gear 420 through a gear train including gears 421, 422, 423 and 424 and shafts 425, 426 and 427. The gear 420 is mounted on a sleeve 430 carrying the cam track 399 and carrying a dial 431 corresponding to the dial 326 of Fig. 3.

The bomb release contact 352 registers with a movable contact 435 carried on a pivoted arm 436 connected to a plunger 437 which is biased upwardly by a spring 438 bearing against a collar 439 on the plunger 437. The plunger 437 is pivoted to a link 440 which is pivoted about a fixed pivot 441 and at one end bears on a collar 442 on the plunger 385. At its other end the link 440 bears on a lever 443 which is pivoted about a fixed pivot 444 and at its other end is confined between collars 445 and 446 on the plunger 401.

The above described mechanism is designed to cause the pointer 407 and dial 416 to make several revolutions to each revolution of the pointer 408 and dial 431. As long as both plungers 385 and 401 are held down by their cam followers 382 and 398 riding on the annular surfaces of the cam tracks 383 and 399 respectively the spring 438 holds the contact 435 in open position. When the cam follower 382 passes the notch in its cam track 383 the spring tends to raise the plunger 385 but is prevented from doing so by the lever 443 and link 440 as long as the plunger 401 is held down by its cam follower 398.

When, however, the cam follower 398 registers with the notch in its cam track 399 the plunger 401 is raised by the spring 402 and the lever 443 is released from the link 440. Thereafter, when the cam follower 382 is again brought into registration with the notch in its cam track 383 the plunger 385 is raised and actuates the link 440 to depress the plunger 437 and close the bomb release contacts 435 and 352.

This embodiment permits accurate timing of the closing of the contacts as the fire control cam track 383 may be geared up as desired but cannot actuate the contacts until released by the coarse control cam track.

Although a specific embodiment of the invention has been set forth for purposes of illustration, it is to be understood that the invention is capable of various uses and that changes and adaptations may be made therein as will be readily apparent to a person skilled in the art. The invention is only to be limited in accordance with the scope of the following claims.

What is claimed is:

1. A computer for the offset bombing of a target whose offset "S" and bearing "B$t$" from an aiming point are known, comprising input elements settable in accordance with drift "D," heading "H$d$," ground speed "S$g$," trail "T$r$," "S" and "B$t$" a run integrator having a constantly driven "time" input and an input representing "S$g$" and an output shaft driven at a rate representing differential run "$d$R," means for deriving the quantity "A$t$," offset angle, from the quantities ($Bt-B$) including means for deriving the bearing, B, from ($Hd+Br$) where B$r$ is bearing of the aiming point, an offset component solver having inputs representing "S" and "A$t$" and having output component slides representing the components "S$y$" and "S$x$" of "S" along and normal to the bearing line of the aiming point, respectively, a trail component solver having inputs representing "T$r$" and the "B$r$" and having output component slides representing the components "T$y$" and "T$x$" of "T$r$" along and normal to said bearing line respectively, differential means deriving ($Tx-Sx$) from said "T$x$" and "S$x$" component slides, a run component solver having an input component slide actuated by said last means to represent the component "R*x*" of run "R" normal to said bearing line, having a run input driven by said "*d*R" shaft, having an output component slide representing the component "R*y*" of "R" along said bearing line, and having an angle output representing the angle "A*r*" between said bearing line and the ground track, differential means combining the outputs from said "S*y*," "T*y*" and "R*y*" slides to obtain a value (R*y*+S*y*−T*y*)=ground range "R*g*," differential means combining the D input element with said "A*r*" output to obtain (A*r*+D)="B*r*," an indicator, said "B*r*" input and said indicator driven by said last means.

2. A computer for the offset bombing of a target whose offset "S" and bearing "B*t*" from an aiming point are known, comprising input elements settable in accordance with drift "D," heading "H*d*," ground speed "S*g*," trail "T*r*," "S" and "B*t*," a run integrator having a constantly driven "time" input and an input representing "S*g*" and an output shaft driven at a rate representing differential run "*d*R," means for deriving the quantity "A*t*," offset angle, from the quantities (B*t*−B) including means for deriving the bearing, B, from (H*d*+B*r*) where B*r* is bearing of the aiming point, an offset component solver having inputs representing "S" and "A*t*" and having output component slides representing the components "S*y*" and "S*x*" of "S" along and normal to the bearing line of the aiming point, respectively, a trail component solver having inputs representing "T*r*" and the "B*r*" and having output component slides representing the components "T*y*" and "T*x*" of "T*r*" along and normal to said bearing line respectively, differential means deriving (T*x*−S*x*) from said "T*x*" and "S*x*" component slides, a run component solver having an input component slide actuated by said last means to represent the component "R*x*" of run "R" normal to said bearing line, having a run input driven by said "*d*R" shaft, having an output component slide representing the component "R*y*" of "R" along said bearing line, and having an angle output representing the angle "A*r*" between said bearing line and the ground track, differential means combining the outputs from said "S*y*," "T*y*" and "R*y*" slides to obtain a value (R*y*+S*y*−T*y*)=ground range "R*g*," differential means combining the D input element with said "A*r*" output to obtain (A*r*+D)="B*r*," an indicator, said "B*r*" input and said indicator driven by said last means, means representing advance, control means and means actuating said control means in response to registration of said computed "R" generated by said "R" shaft with said advance.

3. A computer for the offset bombing of a target whose offset "S" and bearing "B*t*" from an aiming point are known, comprising input elements settable in accordance with drift "D," heading "H*d*," ground speed "S*g*," time of fall "T*f*," trail "T*r*," "S" and "B*t*," a run integrator having a constantly driven "time" input and an input representing "S*g*" and an output shaft driven at a rate representing differential run "*d*R," means for deriving the quantity "A*t*," offset angle, from the quantities (B*t*−B) including means for deriving the bearing, B, from (H*d*+B*r*) where B*r* is bearing of the aiming point, an offset component solver having inputs representing "S" and "A*t*" and having output component slides representing the components "S*y*" and "S*x*" of "S" along and normal to the bearing line of the aiming point, respectively, a trail component solver having inputs representing "T*r*" and the "B*r*" and having output component slides representing the components "T*y*" and "T*x*" of "T*r*" along and normal to said bearing line respectively, differential means deriving (T*x*−S*x*) from said "T*x*" and "S*x*" component slides, a run component solver having an input component slide actuated by said last means to represent the component "R*x*" of run "R" normal to said bearing line, having a run input driven by said "*d*R" shaft, having an output component slide representing the component "R*y*" of "R" along said bearing line, and having an angle output representing the angle "A*r*" between said bearing line and the ground track, differential means combining the outputs from said "S*y*," "T*y*" and "R*y*" slides to obtain a value (R*y*+S*y*−T*y*)=ground range "R*g*," differential means combining the D input element with said "A*r*" output to obtain (A*r*+D)="B*r*," an indicator, said "B*r*" input and said indicator driven by said last means, an advance multiplier having inputs settable by said "S*g*" and "T*f*" inputs and having an output representing advance "L," control means, and means actuating said control means in response to registration of said computed "R" generated by said "R" shaft with the computed "L" derived from said last output.

4. A computer for the offset bombing of a target whose offset "S" and bearing "B*t*" from an aiming point are known, comprising input elements settable in accordance with drift "D," heading "H*d*," ground speed "S*g*," time of fall "T*f*," trail "T*r*," "S" and "B*t*," a run integrator having a constantly driven "time" input and an input representing "S*g*" and an output shaft driven at a rate representing differential run "*d*R," means for deriving the quantity "A*t*," offset angle, from the quantities (B*t*−B) including means for deriving the bearing, B, from (H*d*+B*r*) where B*r* is bearing of the aiming point, an offset component solver having inputs representing "S" and "A*t*" and having output component slides representing the components "S*y*" and "S*x*" of "S" along and normal to the bearing line of the aiming point, respectively, a trail component solver having inputs representing "T*r*" and the "B*r*" and having output component slides representing the components "T*y*" and "T*x*" of "T*r*" along and normal to said bearing line respectively, differential means deriving (T*x*−S*x*) from said "T*x*" and "S*x*" component slides, a run component solver having an input component slide actuated by said last means to represent the component "R*x*" of run "R" normal to said bearing line, having a run input driven by said "*d*R" shaft, having an output component slide representing the component "R*y*" of "R" along said bearing line, and having an angle output representing the angle "A*r*" between said bearing line and the ground track, differential means combining the outputs from said "S*y*," "T*y*" and "R*y*" slides to obtain a value (R*y*+S*y*−T*y*)=ground range "R*g*," differential means combining the D input element with said "A*r*" output to obtain (A*r*+D)="B*r*," an indicator, said "B*r*" input and said indicator driven by said last means, a triangle solver having inputs representing R*g* and height and having an output representing slant range "R*s*," an advance multiplier having inputs settable by said "S*g*" and "T*f*" inputs and having an output representing advance "L," control means, and means actuating said control means in response to registration of said computed "R" generated by said "R" shaft with the computed "L" derived from said last output.

5. A computer for the offset bombing of a target whose offset "S" and bearing "B*t*" from an aiming point are known, comprising input elements settable in accordance with drift "D," heading "H*d*," ground speed "S*g*," time of fall "T*f*," trail "T*r*," "S" and "B*t*," a run integrator having a constantly driven "time" input and an input representing "S*g*" and an output shaft driven at a rate representing differential run "*d*R," means for deriving the quantity "A*t*," offset angle, from the quantities (B*t*−B) including means for deriving the bearing, B, from (H*d*+B*r*) where B*r* is bearing of the aiming point, an offset component solver having inputs representing "S" and "A*t*" and having output component slides representing the components "S*y*" and "S*x*" of "S" along and normal to the bearing line of the aiming point, respectively, a trail component solver having inputs representing "T*r*" and the "B*r*" and having output component slides representing the components "T*y*" and "T*x*" of "T*r*" along and normal to said bearing line respectively, differential means deriving (T*x*−S*x*) from said "T*x*" and "S*x*" component slides, a run component solver having an input component slide actuated by said last means to represent the component "$Rx$" of run "$R$" normal to said bearing line, having a run input driven by said "$dR$" shaft, having an output component slide representing the component "$Ry$" of "$R$" along said bearing line, and having an angle output representing the angle "$Ar$" between said bearing line and the ground track, differential means combining the outputs from said "$Sy$," "$Ty$" and "$Ry$" slides to obtain a value $(Ry+Sy-Ty)$=ground range "$Rg$," differential means combining the D input element with said "$Ar$" output to obtain $(Ar+D)$="$Br$," an indicator, said "$Br$" input and said indicator driven by said last means, an advance multiplier having inputs settable by said "$Sg$" and "$Tf$" inputs and having an output representing advance "$L$," contact means, and means actuating said contact means in response to registration of said computed "$R$" generated by said "$R$" shaft with the computed "$L$" derived from said last output.

References Cited in the file of this patent

UNITED STATES PATENTS

| | | |
|---|---|---|
| 1,725,617 | Castellani | Aug. 20, 1929 |
| 2,408,356 | Willard | Sept. 24, 1946 |
| 2,412,585 | Klemperer | Dec. 17, 1946 |
| 2,412,632 | Sanders et al. | Dec. 17, 1946 |
| 2,419,239 | White | Apr. 22, 1947 |
| 2,438,112 | Darlington | Mar. 23, 1948 |
| 2,439,381 | Darlington | Apr. 13, 1948 |
| 2,444,678 | Sanders | July 6, 1948 |
| 2,480,208 | Alvarez | Aug. 30, 1949 |